United States Patent
Zarazua

(10) Patent No.: US 6,241,283 B1
(45) Date of Patent: Jun. 5, 2001

(54) AIR BAG WITH INTERNAL TETHER

(75) Inventor: Hector J. Zarazua, Rochester Hills, MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/504,481

(22) Filed: Feb. 15, 2000

(51) Int. Cl.⁷ .................................................. B60R 21/16
(52) U.S. Cl. ................................. 280/743.2; 280/728.1; 280/729
(58) Field of Search ........................... 280/743.2, 743.1, 280/728.1, 728.2, 729

(56) References Cited

U.S. PATENT DOCUMENTS

| | | | |
|---|---|---|---|
| 3,752,501 | * | 8/1973 | Daniel et al. ........................... 280/729 |
| 4,830,401 | * | 5/1989 | Honda ................................... 280/736 |
| 4,887,842 | * | 12/1989 | Sato ..................................... 280/743.2 |
| 5,044,663 | * | 9/1991 | Seizert ................................. 280/730.1 |
| 5,078,423 | * | 1/1992 | Fujita .................................. 280/728.1 |
| 5,172,934 | * | 12/1992 | Frantz et al. ......................... 280/740 |
| 5,205,584 | * | 4/1993 | Honda .................................. 280/743.2 |
| 5,249,824 | * | 10/1993 | Swann et al. ........................ 280/729 |
| 5,378,011 | * | 1/1995 | Rogerson et al. ................... 280/743.1 |
| 5,669,632 | * | 9/1997 | Johnson et al. ..................... 280/743.2 |
| 5,678,858 | | 10/1997 | Nakayama et al. . |
| 5,746,447 | | 5/1998 | Dyer et al. . |
| 5,848,805 | * | 12/1998 | Sogi et al. ........................... 280/743.2 |
| 5,957,485 | * | 9/1999 | Hirai ................................... 280/729 |
| 6,022,046 | * | 2/2000 | Isomura et al. .................... 280/743.2 |
| 6,086,096 | * | 7/2000 | Link et al. .......................... 280/743.2 |

* cited by examiner

Primary Examiner—Douglas Hess
Assistant Examiner—Lynda Jasmin
(74) Attorney, Agent, or Firm—Tarolli, Sundheim, Covell, Tummino & Szabo L.L.P.

(57) ABSTRACT

A vehicle occupant protection apparatus (10) comprises an inflator (12) and an air bag (20). The air bag (20) comprises a front panel (50) and a back panel (52) having generally circular outer peripheral portions (54, 56) sewn to each other. The front panel (50) of the air bag (20) has a retainer portion (60) defining a central opening (62) through which the inflator extends. The retainer portion (60) of the air bag (20) has a plurality of fastener openings (66) spaced apart around the central opening (62) of the retainer portion. A tether (70) extends inside the air bag (20) between the front panel (50) and the back panel (52). The tether (70) has opposite front and back end portions (76, 96). The front end portion (76) of the tether (70) has a configuration extending around the central opening (62) of the front panel (50) and around the inflator (12). The front end portion (76) of the tether (70) has an opening (78) through which the inflator (12) extends. The apparatus (10) further comprises a plurality of fasteners (48) extending through the fastener openings (66) in the retainer portion (60) of the front panel (50) to secure the front panel of the air bag (20) to the inflator (12). The fasteners (48) secure the front end portion (76) of the tether (70) to the retainer portion (60) of the front panel (50) without sewing, so that the retainer portion of the front panel is free of stitching openings.

8 Claims, 2 Drawing Sheets

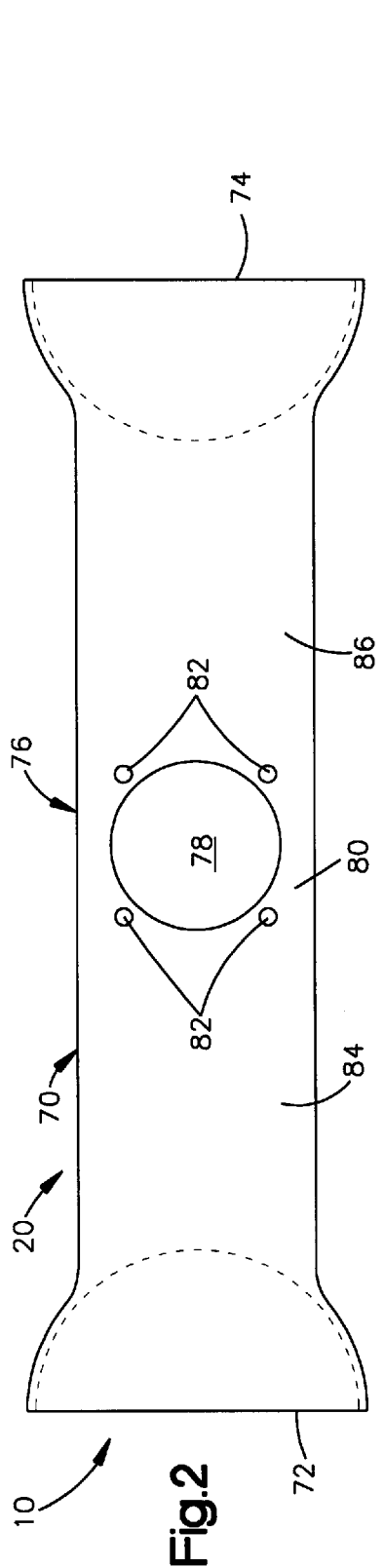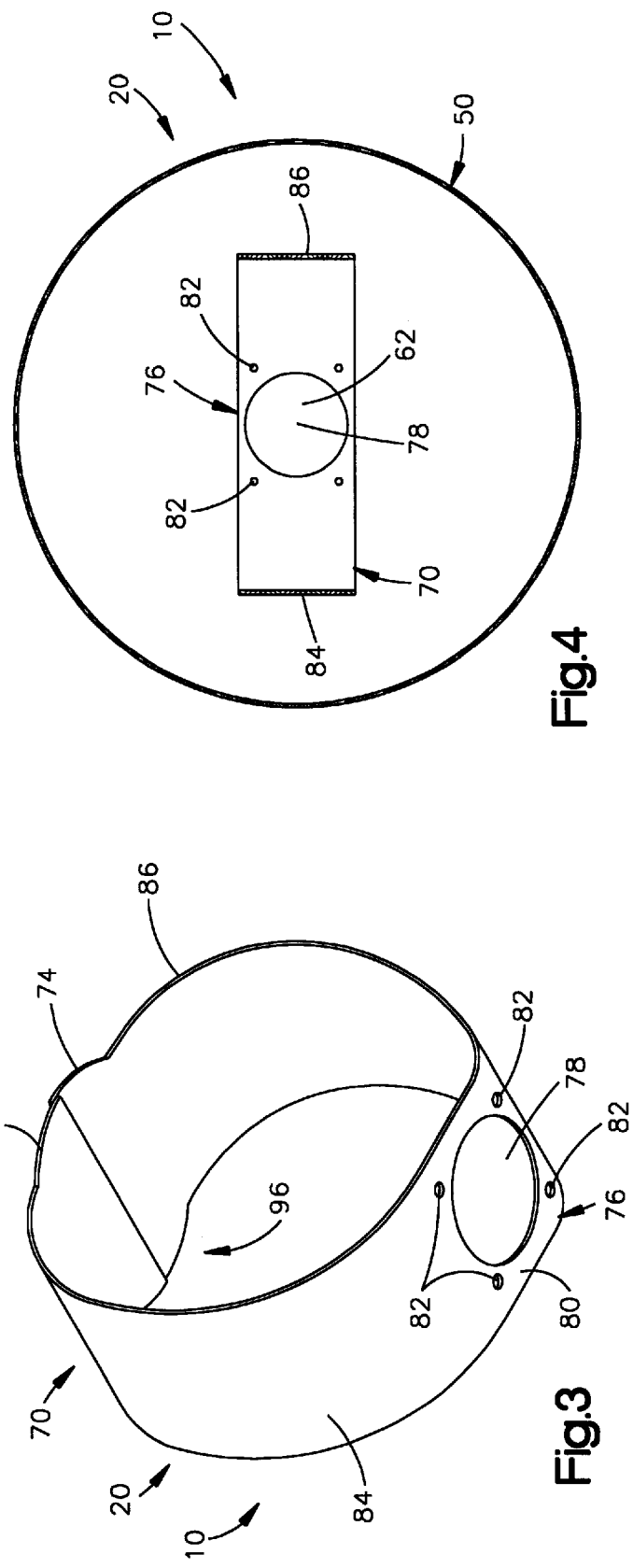

AIR BAG WITH INTERNAL TETHER

BACKGROUND OF THE INVENTION

1. Technical Field

The present invention relates to a vehicle occupant protection apparatus including an inflatable vehicle occupant protection device, such as an air bag. In particular, the present invention relates to an air bag having an internal tether of which one end is mounted adjacent an inflator opening or mouth of the air bag.

2. Description of the Prior Art

It is known to inflate an inflatable vehicle occupant protection device, such as an air bag, to help protect an occupant of a vehicle. An air bag for helping to protect a driver of a vehicle is commonly mounted on the vehicle steering wheel and has a circular, pillow-shaped configuration when inflated. Some air bags have internal tethers for controlling the shape of the air bag when inflated and for limiting the distance by which the air bag inflates outward from the steering wheel. One such air bag is disclosed in U.S. Pat. No. 5,678,858. In this air bag, the internal tether has two end portions that are sewn to the front panel of the air bag, at a location adjacent the inflator.

An air bag is inflated by directing inflation fluid into the air bag at a relatively high pressure. It is desirable to have as little stitching as possible in the material of the air bag because inflation fluid can leak out of the air bag through the small openings formed in the air bag material by the stitches. Stitching openings adjacent the inflator are particularly undesirable because the pressure inside the air bag, when the inflator is actuated, is the highest at that location.

SUMMARY OF THE INVENTION

The present invention is a vehicle occupant protection apparatus comprising an inflator and an air bag. The air bag comprises a front panel and a back panel having generally circular outer peripheral portions sewn to each other. The front panel of the air bag has a retainer portion defining a central opening through which the inflator extends. The retainer portion of the air bag has a plurality of fastener openings spaced apart around the central opening of the retainer portion. The air bag further comprises a tether extending inside the air bag between the front panel and the back panel. The tether has opposite front and back end portions. The front end portion of the tether has a configuration extending around the central opening of the front panel and around the inflator. The front end portion of the tether has an opening through which the inflator extends.

The apparatus further comprises a plurality of fasteners extending through the fastener openings in the retainer portion of the front panel to secure the front panel of the air bag to the inflator. The fasteners secure the front end portion of the tether to the retainer portion of the front panel without sewing, so that the retainer portion of the front panel is free of stitching openings.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 2 is a plan view of a tether that forms a part of the air bag of FIG. 1;

FIG. 3 is a perspective view of the tether of FIG. 2; and

FIG. 4 is a sectional view taken generally along line 4—4 of FIG. 1 with parts removed.

DESCRIPTION OF THE PREFERRED EMBODIMENTS OF THE INVENTION

Figure 1:
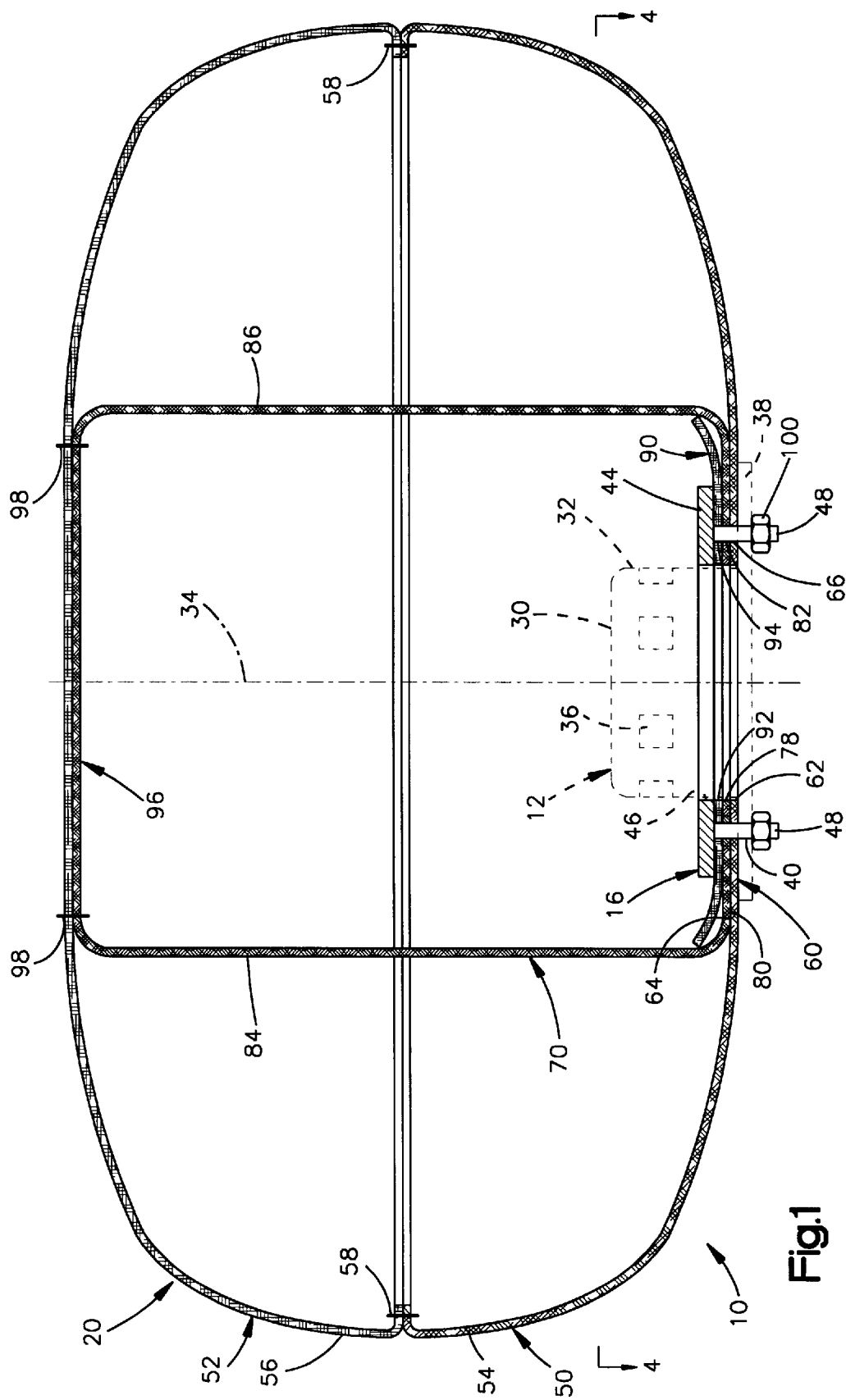
FIG. 1 is a sectional view of portions of a vehicle safety apparatus in accordance with the invention, including an air bag shown in an inflated condition.

The present invention relates to a vehicle occupant protection apparatus including an inflatable vehicle occupant protection device, such as an air bag. In particular, the present invention relates to an air bag having an internal tether of which one end is secured adjacent an inflation fluid opening of the air bag. As representative of the present invention, FIG. 1 illustrates a vehicle occupant protection apparatus or air bag module 10. The air bag module 10 includes an inflator 12, a retainer 16, and an air bag 20.

The inflator 12 comprises a source of inflation fluid for inflating the air bag 20. The inflator 12 may contain an ignitable material which, when ignited, rapidly generates a large volume of gas. The inflator 12 may alternatively contain a stored quantity of pressurized inflation fluid, or a combination of pressurized inflation fluid and ignitable material for heating the inflation fluid.

The inflator 12 includes a body portion 30 having a cylindrical outer side surface 32, which extends parallel to a central axis 34 of the inflator. A plurality of gas outlet openings 36 are formed in the body portion 30 of the inflator 12 for directing inflation fluid into the air bag 20. A mounting flange 38 of the inflator 12 projects radially outward from a lower (as viewed in FIG. 1) end of the body portion 30 of the inflator.

A plurality of fastener openings 40 are formed in the mounting flange 38 of the inflator 12. In the illustrated embodiment, the inflator includes four fastener openings 40, spaced apart equally in a circular array centered on the axis 34. The inflator 12 is connected to vehicle electric circuitry (not shown) to receive an electric signal to actuate the inflator, in a known manner.

The retainer 16 (FIG. 1) is a metal member which secures the inflator 12 to the air bag 20. The retainer 16 has a ring-shaped main body portion 44 with a central opening 46 through which the body portion 30 of the inflator 12 extends. A plurality of fasteners 48 in the form of mounting studs extend from the retainer in a direction parallel to the axis 34. The mounting studs 48 are equal in number to the fastener openings 40 in the inflator mounting flange 38, and are arranged in the same circular configuration as the fastener openings in the inflator mounting flange.

The air bag 20 is made from two panels of a fabric material, such as woven nylon. The panels of the air bag 20 include a front panel 50, which is disposed closer to the front of the vehicle when the air bag is inflated, and a back panel 52, which is disposed closer to the back of the vehicle when the air bag is inflated. The front panel 50 of the air bag 20 is the portion of the air bag that is secured to the inflator. The back panel 52 of the air bag 20 is the portion of the air bag that is engageable by the vehicle occupant.

The back panel 52 of the air bag 20 has a generally circular configuration including a circular outer peripheral portion 56. The front panel 50 has a generally circular configuration similar to that of the back panel 52, including a circular outer peripheral portion 54. The outer peripheral portion 54 of the front panel 50 is sewn to the outer peripheral portion 56 of the back panel 52 with a stitching line indicated schematically at 58. The air bag 20 as thus sewn has a generally pillow-shaped configuration when inflated.

The front panel 50 of the air bag has a central portion or retainer portion 60 that defines a circular central opening 62 centered on the axis 34. The retainer portion 60 of the front panel 50 has an inner side surface 64. The retainer portion 60 of the front panel 50 also has a plurality of fastener openings 66 disposed about the central opening 62. The fastener openings 66 are equal in number to the mounting studs 48 on the retainer 16, and are arranged in the same circular configuration as the mounting studs.

The air bag 20 includes a tether 70. The tether 70 is preferably made from a single piece of flexible fabric material, such as the woven nylon of which the front panel 50 and back panel 52 are made. The tether 70 could, alternatively, be made from more than one piece of material, sewn or otherwise secured together.

The tether 70, prior to assembly into the air bag 20, has an elongate, strap-like configuration as seen in FIG. 2. The tether has first and second opposite end portions 72 and 74. Each of the end portions 72 and 74 has a generally semi-circular shape.

A front end portion or central portion 76 of the tether 70 has an inner circular edge extending around and defining a circular central opening 78 in the tether. The central portion 76 has an outer side surface 80. A first leg portion 84 of the tether 70 extends between the central portion 76 and the first end portion 72 of the tether. A second leg portion 86 of the tether 70 extends between the central portion 76 and the second end portion 74 of the tether.

The central portion 76 of the tether 70 also has a plurality of fastener openings 82 circumscribing the central opening 78. The fastener openings 82 are equal in number to the mounting studs 48 on the retainer 16, and are arranged in the same circular configuration as the mounting studs on the retainer, the fastener openings 40 in the inflator mounting flange 38, and the fastener openings 66 in the front panel 50 of the air bag 20.

The air bag 20 optionally includes a heat shield 90. The heat shield 90 is a circular piece of material that overlies the central portion 76 of the tether 70. The heat shield 90 has a central opening 92 that is aligned with the central opening 78 in the tether 70, and fastener openings 94 that are aligned with the fastener openings 82 in the tether. The heat shield 90 is preferably secured to the tether 70 by melting and bonding together the edges of the openings in the heat shield and the tether 70. This melting and bonding occurs when the openings are cut simultaneously with a laser.

In assembly of the air bag 20, the front and back panels 50 and 52 are sewn together in an inverted or "inside out" condition. The first and second end portions 72 and 74 of the tether 70 are sewn together as illustrated in FIG. 3, to form a back end portion 96 of the tether. The back end portion 96 of the tether 70 is sewn to the inside of the back panel 52 of the air bag 20, with a stitching circle indicated schematically at 98 in FIG. 1. The air bag 20 is then inverted to a "right side out" condition, and the retainer 16 is inserted into the air bag.

The central portion 76 of the tether 70 is placed adjacent the retainer portion 60 of the front panel 50 of the air bag 20. The outer side surface 80 of the central portion 76 of the tether 70 overlies and is in abutting engagement with the inner side surface 64 of the retainer portion 60 of the front panel 50. The fastener openings 82 in the central portion 76 of the tether 70 are aligned with the fastener openings 66 in the retainer portion 60 of the front panel 50. The mounting studs 48 on the retainer 16 extend through the aligned fastener openings in the heat shield 90, the tether 70, and the front panel 50.

The inflator 12 is inserted so that the body portion 30 of the inflator extends through the aligned central openings in the front panel 50, the tether 70, the heat shield 90, and the retainer 16. The central portion 76 of the tether 70 extends completely and uninterruptedly as one piece around the body portion 30 of the inflator 12. The mounting studs 48 on the retainer 16 extend through the fastener openings 40 in the inflator mounting flange 38.

A plurality of nuts 100 are screwed onto the mounting studs 48. The nuts 100 and the retainer 16 clamp together the retainer portion 60 of the front panel 50 of the air bag 20, the central portion 76 of the tether 70, and the mounting flange 38 of the inflator 12. The assembly of the inflator 12, the air bag 20, and the retainer 16 is secured in a manner not shown to a portion of the vehicle, such as the vehicle steering wheel assembly.

The mounting studs 48 and the nuts 100 secure the front end portion 76 of the tether 70 to the retainer portion 60 of the front panel 50 without sewing. The heat shield 90 also is not sewn to the front panel 50 of the air bag 20. As a result, the retainer portion 60 of the front panel 50 of the air bag 20 is free of stitching openings. This can help to minimize leakage of inflation fluid from the air bag 20 during inflation.

From the above description of the invention, those skilled in the art will perceive improvements, changes and modifications in the invention. Such improvements, changes and modifications within the skill of the art are intended to be covered by the appended claims.

Having described the invention, I claim:

1. A vehicle occupant protection apparatus comprising:
   an inflator;
   an air bag comprising a front panel and a back panel having generally circular outer peripheral portions sewn to each other;
   said front panel of said air bag having a retainer portion defining a central opening through which said inflator extends, said retainer portion of said air bag having a plurality of fastener openings spaced apart around said central opening of said retainer portion;
   said air bag further comprising a tether extending inside said air bag between said front panel and said back panel, said tether having opposite front and back end portions;
   said front end portion of said tether having a configuration extending around said central opening of said front panel and around said inflator, said front end portion of said tether having an opening through which said inflator extends;
   said apparatus further comprising a plurality of fasteners extending through said fastener openings in said retainer portion of said front panel to secure said front panel of said air bag to said inflator;
   said fasteners securing said front end portion of said tether to said retainer portion of said front panel without sewing, said retainer portion of said front panel being free of stitching openings.

2. An apparatus as set forth in claim 1 wherein said tether is made from a first piece of flexible fabric material having an elongate configuration including first and second opposite end portions and an intermediate portion;
   said first and second end portions of said first piece of fabric material being joined to said back panel adjacent each other to form said back end portion of said tether;

said intermediate portion of said piece of material forming said front end portion of said tether and having said opening through which said inflator extends.

3. An apparatus as set forth in claim 2 wherein said front end portion of said tether overlies and is in abutting engagement with said retainer portion of said front panel.

4. An apparatus as set forth in claim 1 wherein said fasteners are mounting studs on a retainer that extends around said inflator.

5. An apparatus as set forth in claim 1 wherein said tether has an elongate, strap-like configuration including first and second end portions, said front end portion of said tether being disposed between said first and second end portions, said front end portion comprising one continuous piece of fabric material that extends completely and uninterruptedly around said inflator.

6. An apparatus as set forth in claim 5 wherein said front end portion of said tether has a major side surface that overlies and is in abutting engagement with a major side surface of said retainer portion of said front panel of said air bag.

7. An apparatus as set forth in claim 6 wherein said fasteners clamp said front end portion of said tether to said retainer portion of said front panel of said air bag.

8. An apparatus as set forth in claim 1 wherein said fasteners clamp said front end portion of said tether to said retainer portion of said front panel of said air bag.

* * * * *